United States Patent [19]
Findeisen et al.

[11] 3,843,652
[45] Oct. 22, 1974

[54] PROCESS FOR PREPARING QUINAZOLINES

[75] Inventors: Kurt Findeisen; Hans Holtschmidt; Kuno Wagner, all of Leverkusen, Germany

[73] Assignee: Bayer Aktiengesellschaft, Leverkusen, Germany

[22] Filed: May 3, 1972

[21] Appl. No.: 249,831

[30] Foreign Application Priority Data
May 21, 1971  Germany............................ 2125229

[52] U.S. Cl. 260/251 Q, 260/256.4 Q, 260/256.5 R, 260/999
[51] Int. Cl............................................. C07d 51/48
[58] Field of Search................................ 260/251 Q

[56] References Cited
UNITED STATES PATENTS
3,652,637   3/1972   Bimber ......................... 260/465 G

*Primary Examiner*—Raymond V. Rush
*Attorney, Agent, or Firm*—Burgess, Dinklage & Sprung

[57]  ABSTRACT

Quinazolines are prepared by reacting a halogen compound of the formula $$R^1 - CCl_2 - N = CCl - R^2$$

wherein $R^1$ and $R^2$, which can be the same or different, are selected from the group of chlorine, lower aliphatic, lower halo-alkyl, optionally substituted aromatic or optionally substituted 5- or 6-membered heterocyclic, and in addition $R^1$ can be hydrogen with an aromatic amine or a salt thereof at temperatures in the range from 0° to 200°C.

8 Claims, No Drawings

PROCESS FOR PREPARING QUINAZOLINES

This invention relates to a process for the production of quinazolines.

SUMMARY

It has been found that high yields of quinazolines are obtained in a smooth reaction by reacting a compound of the general formula (I), $$R^1 - CCl_2 - N = CCl - R^2 \qquad (I)$$

wherein $R^1$ and $R^2$, which can be the same or different, are selected from the group of chlorine, lower aliphatic, lower halo-alkyl, optionally substituted aromatic or optionally substituted 5- or 6-membered heterocyclic, and in addition $R^1$ can be hydrogen
with an aromatic amine or a salt thereof at temperatures in the range from 0° to 200°C.

DESCRIPTION

The reaction is preferably carried out at temperatures in the range from 60° to 160°C.

The reaction is preferably carried out in the presence of an inert organic solvent.

Depending upon the starting compound of general formula (I) used, it may be advantageous to carry out the process according to the invention in different temperature ranges.

Where the starting compounds are substituted 1,1,3-trichloro-2-aza-propenes-2, the reaction is preferably carried out at temperatures of from 60° to 200°C and more particularly at temperatures of from 60° to 160°C.

Where the starting compounds are 1,1,3,3-tetrachloro-2-aza-2-propenes, the reaction is preferably carried out at temperatures of from 60° – 160°C and more particularly at temperatures of from 90° to 130°C.

Examples of lower aliphatic radicals and haloalkyl radicals ($R^1$ and/or $R^2$) include linear and optionally branched aliphatic radicals with up to 8 carbon atoms, more particularly up to 4 carbon atoms, optionally substituted one or more times by chlorine. Aliphatic radicals naturally also include cycloaliphatic radicals preferably those having 5 or 6 carbon atoms in the ring.

Suitable optionally substituted aromatic radicals ($R^1$ and/or $R^2$) are those containing up to 14 carbon atoms, for example the naphthyl radical, but preferably the phenyl radical.

In the context of the invention, optionally substituted 5- or 6-membered heterocyclic radicals are those which contain nitrogen, oxygen or sulphur as hetero atoms in the heterocyclic ring system. The heterocyclic ring system may of course also contain 2 or more hetero atoms which may be same or different, e.g., only nitrogen atoms or a nitrogen atom or nitrogen atoms together with an oxygen or sulphur atom; the heterocyclic ring system may of course also be anellated to a benzene ring system.

The following are mentioned as examples of substituents for the optionally substituted aromatic and heterocyclic radicals $R^1$ and/or $R^2$: halogen atoms, for example fluorine or bromine, but preferably chlorine; lower alkyl or alkoxy groups having up to 8 but preferably up to 4 carbon atoms, especially methyl, ethyl, methoxy or ethoxy groups; or nitro groups. The aromatic radicals ($R^1$ and/or $R^2$) may of course be substituted one or more times by the same or different substituents; in the case of polynuclear ring systems, the substituents may be distributed among one or more rings.

The starting compounds used for the process according to the invention are known and can be obtained by known methods [e.g. Angewandte Chemie, 74, page 848 (1962); Liebigs Annalen der Chemie, 701, pages 107 - 116 (1967)].

The following are mentioned as examples of starting compounds: 1,3-bis-(trichloroethyl)-1,3,3-trichloro-2-aza-propene; 1-phenyl-1,3,3,3-tetrachloro-2-aza-propene; 1-trichloroethyl-3-phenyl-1,3,3-trichloro-2-aza-propene; 1-phenyl-3-trichloroethyl-1,3,3-trichloro-2-aza-propene; 1-trichloromethyl-3-(2'-chlorophenyl)-, 1-trichloromethyl-3-(3'-chlorophenyl)- and 1-trichloromethyl-3-(4'-chlorophenyl)-1,3,3-trichloro-2-aza-propene; 1-trichloromethyl-3-(3',4-dichlorophenyl)- and 1-trichloromethyl-3-(2',6'-dichlorophenyl)-1,3,3-trichloro-2-aza-propene; 1,3-bis-(trichloromethyl)-1,3,3-trichloro-2-aza-propene; and 3-trichloromethyl-1-pentachloroethyl-1,3,3-trichloro-2-aza-propene.

The α-dichloromethyl isocyanide dichlorides preferably used for the process according to the invention are known and can be obtained by known methods [e.g. Angewandte Chemie 79, pages 663 – 680 (1967) and Angewandte Chemie 80, pages 942 – 953 (1968)]. The following are examples of such compounds: dichloromethyl isocyanide dichloride; trichloromethyl isocyanide dichloride; 1,1-dichloro-2-chloroethyl isocyanide dichloride; pentachloroethyl isocyanide dichloride; and 1-phenyl-1,1,3,3-tetrachloro-2-aza-propene.

The aromatic amines used for the process according to the invention have the general formula (II),

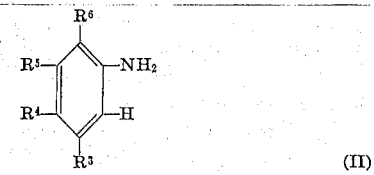

(II)

in which $R^3$, $R^4$, $R^5$ and $R^6$ are the same or different and each represents a hydrogen atom; a halogen atom (for example fluorine or bromine, but preferably chlorine); a lower alkyl or alkoxy group having up to 8 preferably up to 4 carbon atoms, especially a methyl, ethyl, methoxy or ethoxy group; or $R^4$ and $R^5$ together form an alicyclic, aromatic or heterocyclic anellated ring with 5 or 6 ring members which may in turn be substituted by one or more of the aforementioned radicals.

The quinazolines which may be obtained by the process according to the invention have the general formula (III),

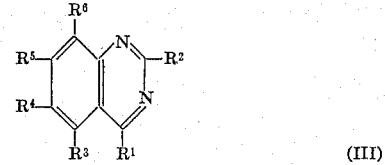

(III)

in which $R^1$, $R^2$, $R^3$, $R^4$, $R^5$ and $R^6$ are as defined above.

The process according to the invention is illustrated by way of example with reference to the reaction of trichloromethyl isocyanide dichloride with aniline hydrochloride according to the following scheme:

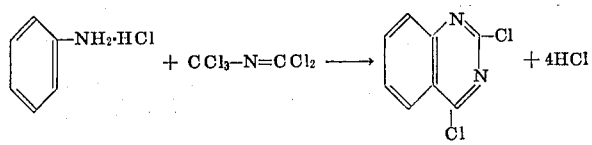

The process according to the invention can be readily carried out by reacting the compound of general formula (I) and a salt, preferably the hydrochloride, of the aromatic amine of general formula (II) at room temperature preferably in the presence of an inert organic solvent, and subsequently heating the resulting mixture to the selected reaction temperature. The beginning of the reaction and the completion of the reaction are evident from the onset and cessation, respectively, of the evolution of gas.

The reaction can, however, also be carried out by adding the free amine to a solution of the starting compound of general formula (I) which has been heated to the selected reaction temperature, the reaction beginning when that temperature is reached and progressing to completion in the solution which is maintained at the reaction temperature.

The starting compounds of general formulae (I) and (II) are generally used in a molar ratio of approximately 1 : 1. However, a deficit or excess of up to about 10 mol percent in respect of one or other of the compounds has no adverse effect, although it is generally not recommended. An excess may be of advantage, however, in cases where one of the starting compounds is more readily available than the other.

The reaction is generally, although not necessarily, carried out in the presence of an inert organic solvent. Examples of suitable inert organic solvents include hydrocarbons, chlorinated hydrocarbons and ethers, for example benzene, toluene, chlorobenzene, dichlorobenzene, tri- and per-chloroethylene, chloroform, carbon tetrachloride, dioxan, sulpholan or nitrobenzene. Mixtures of the aforementioned solvents can, of course, also be used.

In general, the reaction is carried out at atmospheric pressure although it may be advantageous to carry out the reaction at elevated pressure depending upon both the selected reaction temperature and the boiling point of the solvent used.

It may also be advantageous, although it is not essential, to carry out the reaction in the presence of Lewis acids which act as catalysts. Examples of suitable catalysts include iron (III) chloride, aluminium chloride, tin (IV) chloride and zinc (II) chloride.

The quinazolines which may be obtained by the process according to the invention are valuable intermediates in the production of dyestuffs cf. Chem. Abs. 45, 6850 (1951); Chem. Abs. 49, 6615 (1959), plastics and pest-control agents and are themselves active as pest-control agents. For example, chloroquinazolines can be used to modify dyes which contain hydroxy and amino groups with which they are able to react; to prepare surface-active substances of advantageously low basicity in conjunction with long-chain aliphatic amines; which substances are of preferably utility with regard to detergents for bathing, dish-cleaning, washing, and to prepare biologically active substances in conjunction with a number of amines (cf. W.L.F. Armarego, Fused Pyrimidines, Part I, Quinazolines, John Wiley and Sons, Ltd., New York, London, Sidney, (1967), pages 234, 235; 267; ref. 108, 268, ref. 151; 508 – 512).

EXAMPLE 1

129.6 g (1.0 mol) of aniline hydrochloride are suspended in a solution of 300 ml of o-dichlorobenzene and 215 g (1.0 mol) of trichloromethyl isocyanide dichloride in a 1-litre two-necked flask. The heterogeneous mixture is slowly heated until hydrogen chloride begins to be evolved, the reaction being completed by gradually increasing the temperature to 150°C. On completion of the reaction, the hydrochloride has passed into solution. After cooling, the o-dichlorobenzene is distilled off in a rotary evaporator and the residue recrystallised from petrol for cleaning. Yield: 179 g of 2,4-dichloroquinazoline (90 percent of the theoretical); melting point 116°C (trichloromethyl isocyanide dichloride = 1,1,1-trichloro-3,3-dichloro-2-aza-propene-2).

EXAMPLE 2

71.7 g (0.5 mol) of p-aminotoluene hydrochloride, 107.5 g (0.5 mol) of trichloromethyl isocyanide dichloride and 200 ml of chlorobenzene are mixed with stirring and the resulting mixture heated to 115°C with accompanying evolution of gas. The reaction is carried through to completion by heating to the boiling point of the chlorobenzene. After the solvent has been distilled off, the residue is recrystallised from petrol for cleaning. Yield: 66 g of 6-methyl-2,4-dichloroquinazoline (62 percent of the theoretical); melting point 142°C.

| Analysis: | Calculated: | C: 50.73% H: 2.84% N: 13.15% Cl: 33.28% |
|---|---|---|
| | Found: | C: 51.0% H: 3.11% N: 13.20% Cl: 33.10% |

EXAMPLE 3

71.8 g (0.5 mol) of o-toluidine hydrochloride are reacted with 107.5 g (0.5 mol) of trichloromethyl isocyanide dichloride and the reaction mixture worked up as described in Example 2. Yield: 56 g of 8-methyl-2,4-dichloroquinazoline (52.5 percent of the theoretical); melting point: 140°C.

| Analysis: | Calculated: | C: 50.73% H: 2.84% N: 13.15% Cl: 33.28% |
|---|---|---|
| | Found: | C: 50.70% H: 2.70% N: 13.30% Cl: 33.40% |

EXAMPLE 4

63,8 g (0.5 mol) of p-chloroaniline are added to 500 ml of o-dichlorobenzene and 30 g (0.84 mol) of hydrochloric acid are then introduced at room temperature over a period of 40 minutes. 5 g of iron (III) chloride and 107.5 g of trichloromethyl isocyanide dichloride are then added, and the mixture heated to 160°C over a period of 4 hours. After the evolution of hydrogen chloride has ceased, the o-dichlorobenzene is distilled off and the residue recrystallised from ethyl acetate. Yield: 58 g of 2,4,6-trichloroquinazoline (63 percent of the theoretical); melting point: 128°C.

| Analysis: | Calculated: | C: 41.15% H: 1.30% N: 11.99% Cl: 45.55% |
|---|---|---|
| | Found: | C: 41.40% H: 1.50% N: 12.10% Cl: 45.30% |

EXAMPLE 5

67.3 g (0.47 mol) of α-naphthyl amine are dissolved in 650 ml of distilled o-dichlorobenzene and an excess of hydrochloric acid (50 g) is then introduced at room temperature. 101 g (0.47 mol) of trichloromethyl isocyanide dichloride are added dropwise to this heterogeneous mixture at 25°C and the mixture then gradually heated to 165°C until no more hydrogen chloride is evolved. A homogeneous solution is obtained. The solvent is distilled off and the residue recrystallised from ethanol, one halogen atom in the product being substituted by an ethoxy group. Yield: 76 g of 2-ethoxy-4-chloro-7,8-benzoquinazoline (68.2 percent of the theoretical); melting point 134°C.

| Analysis: | Calculated: | C: 64.99% H: 4.29% N: 10.83% O: 6.18% |
|---|---|---|
| | Found: | C: 65.10% H: 4.36% N: 10.70% O: 6.10% |
| | Calculated: | Cl: 13.71% |
| | Found: | Cl: 13.08% |

EXAMPLE 6

10.3 g (0.11 mol) of aniline are dissolved in 80 ml of o-dichlorobenzene in a three-necked flask and then converted to the hydrochloride by the introduction of hydrogen chloride. 28.4 g of α,α-dichlorobenzyl isocyanide dichloride dissolved in 50 ml of o-dichlorobenzene are then added at room temperature. The heterogeneous reaction mixture is heated and the temperature increased until no more hydrogen chloride is evolved. The reaction mixture is then concentrated and the residue recrystallised from a little o-dichlorobenzene. Yield: 16.1 g (74 percent of the theoretical) of 2-chloro-4-phenyl-quinazoline; melting point: 114°C.

| Analysis: | Calculated: | C: 69.86% H: 3.77% N: 11.91% Cl: 14.73% |
|---|---|---|
| | Found: | C: 70.20% H: 4.00% N: 11.80% Cl: 14.60% |

(α,α-dichlorobenzyl isocyanide dichloride = 1-phenyl-1,1-dichloro-3,3-dichloro-2-aza-propene-2).

EXAMPLE 7

8.7 g (0.94 mol) of aniline in 130 ml of nitrobenzene are converted into the hydrochloride at 20°C as described in Example 6, and 36 g of N-pentachloroethyl trichloromethyl imide chloride subsequently added at this temperature. The reaction mixture is heated to 150°C over a period of 20 minutes, at the end of which time the evolution of hydrogen chloride has ceased. The solvent is distilled off and the residue recrystallised from petrol for cleaning. Yield: 26.4 g of 2,4-di-(trichloromethyl)-quinazoline (76 percent of the theoretical); melting point 118°C.

| Analysis: | Calculated: | C: 32.92% H: 1.11% N: 7.68% Cl: 58.30% |
|---|---|---|
| | Found: | C: 33.10% H: 1.30% N: 7.60% Cl: 58.20% |

EXAMPLE 8

107.5 g (0.5 mol) of trichloromethyl isocyanide dichloride, 3 g of iron (III) chloride and 500 ml of o-dichlorobenzene are introduced into a three-necked flask. The reaction mixture is heated to 160°C and a solution of 46.4 g of aniline in 100 ml of dichlorobenzene slowly added dropwise at that temperature. The dropping rate is regulated so that the solution is always homogeneous.

On completion of the dropwise addition, the reaction mixture is maintained at the aforementioned temperature for another 30 minutes, after which the solvent is distilled off and the residue recrystallised from petrol for cleaning. Yield: 82 g of 2,4-dichloroquinazoline (82.2 percent of the theoretical); melting point 116°C.

What is claimed is:

1. Process for preparing quinzazoline having the formula

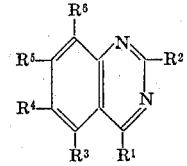

wherein $R^1$ and $R^2$, which can be the same or different, are selected from the group of chlorine, straight or branched chain haloalkyl having up to 8 carbon atoms, aromatic selected from the group of phenyl and naphthyl and such aromatic substituted by a member from the group of halogen, lower alkyl, lower alkoxy, and nitro and in addition $R^1$ can be hydrogen; $R^3$, $R^4$, $R^5$ and $R^6$, which can be the same or different are selected from the group of hydrogen, halogen, lower alkyl, lower alkoxy which comprises the step of reacting a halogen compound having the formula $$R^1 - CCl_2 - N = CCl - R^2$$

wherein $R^1$ and $R^2$ are defined previously, with an aromatic amine having the formula

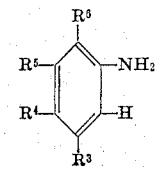

wherein $R^3$, $R^4$, $R^5$ and $R^6$ are defined previously, or the hydrochloride salt thereof, at temperatures in the range from 0° to 200°C.

2. Process of claim 1 wherein the reaction is carried out at a temperature of from 60° to 160°C.

3. Process of claim 1 wherein the halogen compound is a substituted 1,1,3-trichloro-2-aza-propene-2.

4. Process of claim 3 wherein the reaction is carried out at a temperature of from 90° to 130°C.

5. Process of claim 1 wherein the reaction is carried out in the presence of a Lewis acid.

6. Process of claim 5 wherein the Lewis acid is selected from the group of iron (III) chloride, aluminum chloride, tin (IV) chloride, and zinc (II) chloride.

7. Process of claim 1 wherein the reaction is carried out in an inert organic solvent.

8. Process of claim 1 wherein trichlormethyl isocyanide dichloride or N-pentachloroethyl trichloromethyl imide chloride is reacted with aniline or aniline hydrochloride.

* * * * *